Dec. 9, 1924. Re. 15,961

G. L. HARVEY

DRAFT RIGGING

Original Filed Jan. 7, 1922. 3 Sheets-Sheet 1

Inventor:
George L. Harvey, Dec.
By Helen A Harvey
Kellogg Fairbank
Executors Executor
By Chas F Murray
Atty Witness:
R. C. Larson Dec. 9, 1924.

Re. 15,961

G. L. HARVEY

DRAFT RIGGING

Original Filed Jan. 7, 1922 3 Sheets-Sheet 2

Inventor:
George L. Harvey, Deceased.
By Helen A. Harvey
Kellogg Hailbach
Guentzer Executor
By Chas F. Murray
Atty Witness:
R. C. Dixon Dec. 9, 1924. Re. 15,961
G. L. HARVEY
DRAFT RIGGING
Original Filed Jan. 7, 1922 3 Sheets-Sheet 3
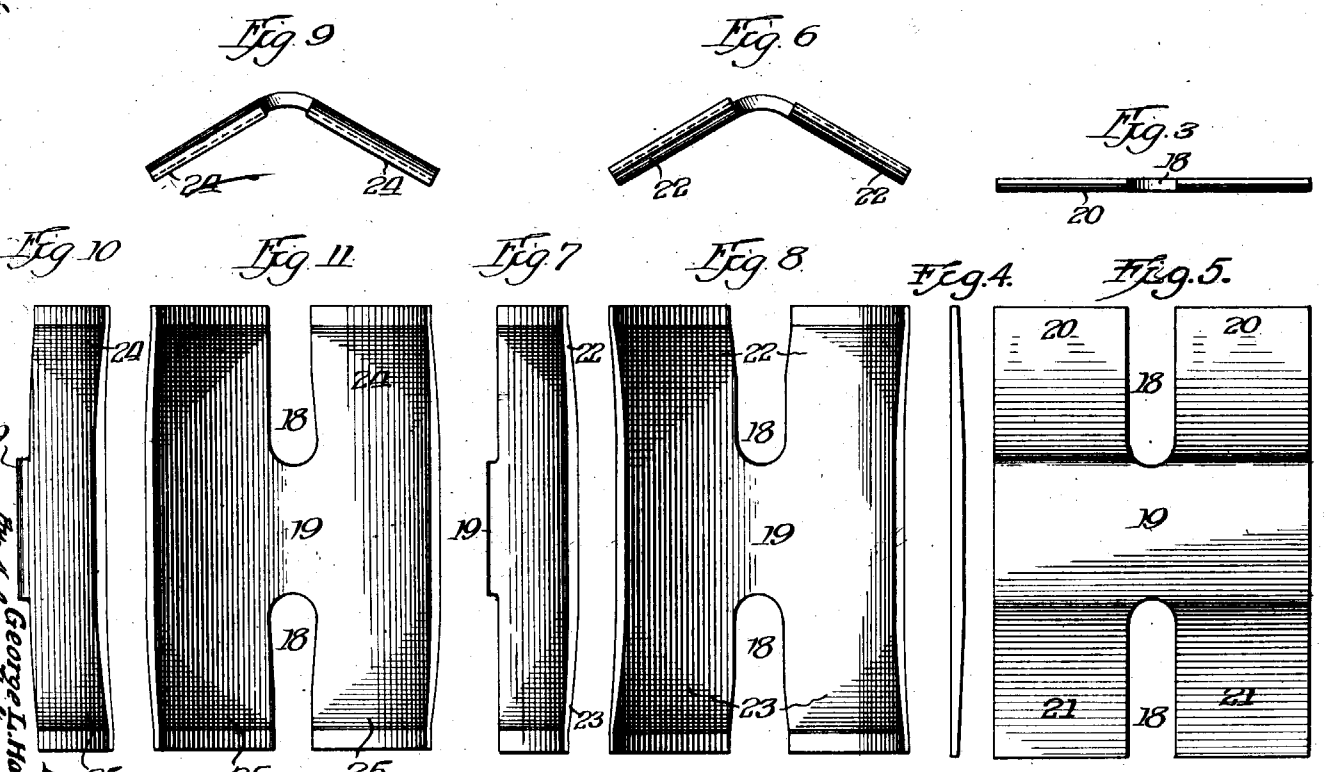
Witness:
Ed. C. Kerson
Inventor:
George L. Harvey Deceased
By Helen T. Harvey
Kellogg Fairbank
Executrix-Executor
By Chas. F. Harvey. Atty.

Reissued Dec. 9, 1924. Re. 15,961

UNITED STATES PATENT OFFICE.

GEORGE L. HARVEY, DECEASED, LATE OF CHICAGO, ILLINOIS; BY HELEN A. HARVEY, EXECUTRIX, AND KELLOGG FAIRBANK, EXECUTOR, BOTH OF CHICAGO, ILLINOIS.

DRAFT RIGGING.

Original No. 1,454,509, dated May 8, 1923, Serial No. 527,571, filed January 7, 1922. Application for reissue filed August 4, 1924. Serial No. 730,088.

*To all whom it may concern:*

Be it known that GEORGE L. HARVEY, deceased, formerly a citizen of the United States, and resident of Chicago, in the county of Cook and State of Illinois, did invent certain new and useful Improvements in a Draft Rigging, of which the following is a specification.

The invention relates to draft rigging or buffing devices for railway cars and particularly to a novel friction rigging having peculiar advantages not found in the devices heretofore proposed.

One of the objects of the invention is to provide a frictional draft rigging in which the friction devices are all self-contained and each element of the shock absorbing device is a unit. The result is that even under the most extreme loads there is no tendency towards bursting of any of the parts. In friction devices of the barrel type it is practically impossible to so construct the friction producing devices as to prevent breakage under extreme loads. Furthermore, there is a strong tendency in devices of this sort, after wear has taken place, to stick; that is, to fail to return to initial position following the application of a load.

In the device of this invention there is no spreading or bursting tendency of any of the parts; neither is there any possibility of failure to return to initial position.

Another important advantage in the construction is that the frictional resistance is progressively cumulative, the friction increasing with the increase of area of the parts in contact.

The device is capable of the widest variation in capacity, the number of plates employed and the angle of bending of the respective plates serving to determine the total capacity, as well as the responsiveness thereof to initial light loads.

The invention will be more readily understood by reference to the accompanying drawings, in which;

Figs. 3, 4 and 5 are end, edge and top views respectively of one of the plates prior to the first bending operation;

Figs. 6, 7 and 8 are end, side and bottom views respectively of one set of plates in their completed condition, and, Figs. 9, 10 and 11 are similar views of a completed cooperating plate.

Figure 1:
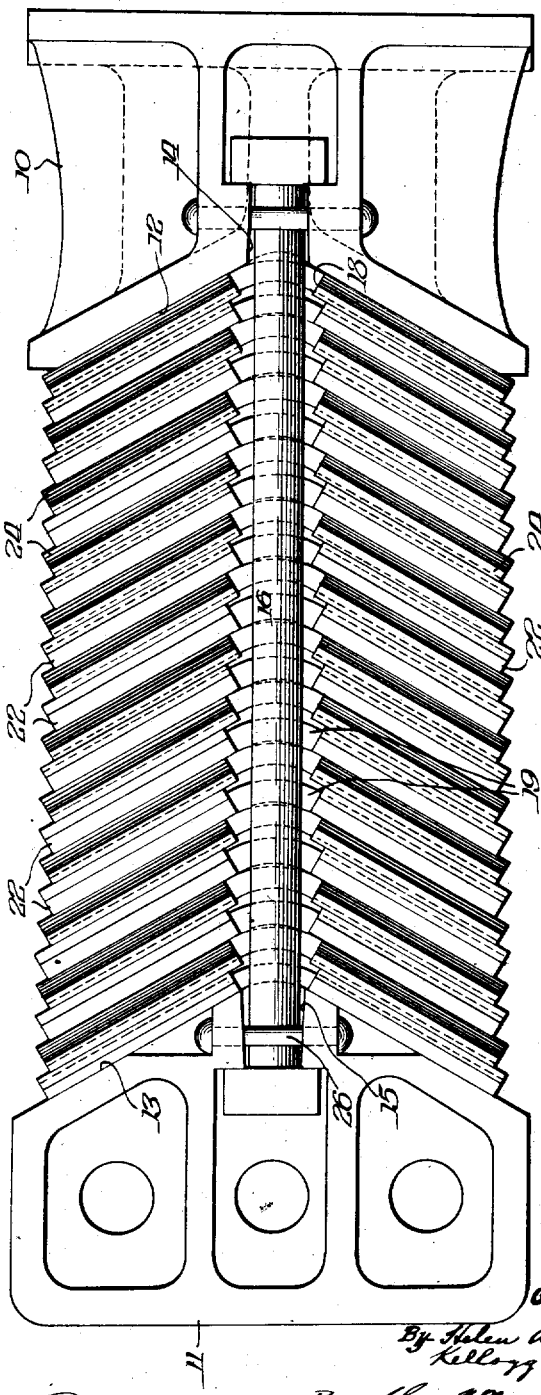
Fig. 1 is a side view of a draft rigging constructed in accordance with this invention.

In the drawings it will be seen that front and rear follower blocks 10, 11 respectively are provided, the block 10 having a triangular recess 12 in the face thereof, while the block 11 has a correspondingly shaped projection 13 on its face. The blocks are suitably cored out and are provided with side openings 15, 15, for the accommodation of longitudinally extending headed bolts 16, 17, which serve to retain the friction plates in place. A draw-bar strap, not shown, or similar means for communicating the draw-bar movement to the follower blocks will be provided in the usual manner.

The friction plates, best shown in Figs. 3 to 11 inclusive, are of peculiar construction. The plates, at their initial stage of manufacture, are of rectangular outline and are provided with oppositely disposed notches 18, 18, extending inwardly from the ends and arranged with their axes in alignment. The plates have a central portion 19 of uniform thickness and side portions which taper from the central portions to their margins. The side portions are intersected by the notches, thereby forming wings 20, 20, 21, 21, one on each side of a notch. The plates when so formed are next subjected to a bending operation whereby they assume the angular shape shown in Figs. 6 and 9, the bend taking place along a longitudinal line coincident with the longitudinal axis of the notches 18. In the next operation the wings 22—22, 23—23, of the plates, shown in Figs. 6 to 8 inclusive, are laterally deflected or curved outwardly; that is to say, the thinned ends of the wings, as viewed in Fig. 6, are bent upwardly.

Figure 2:
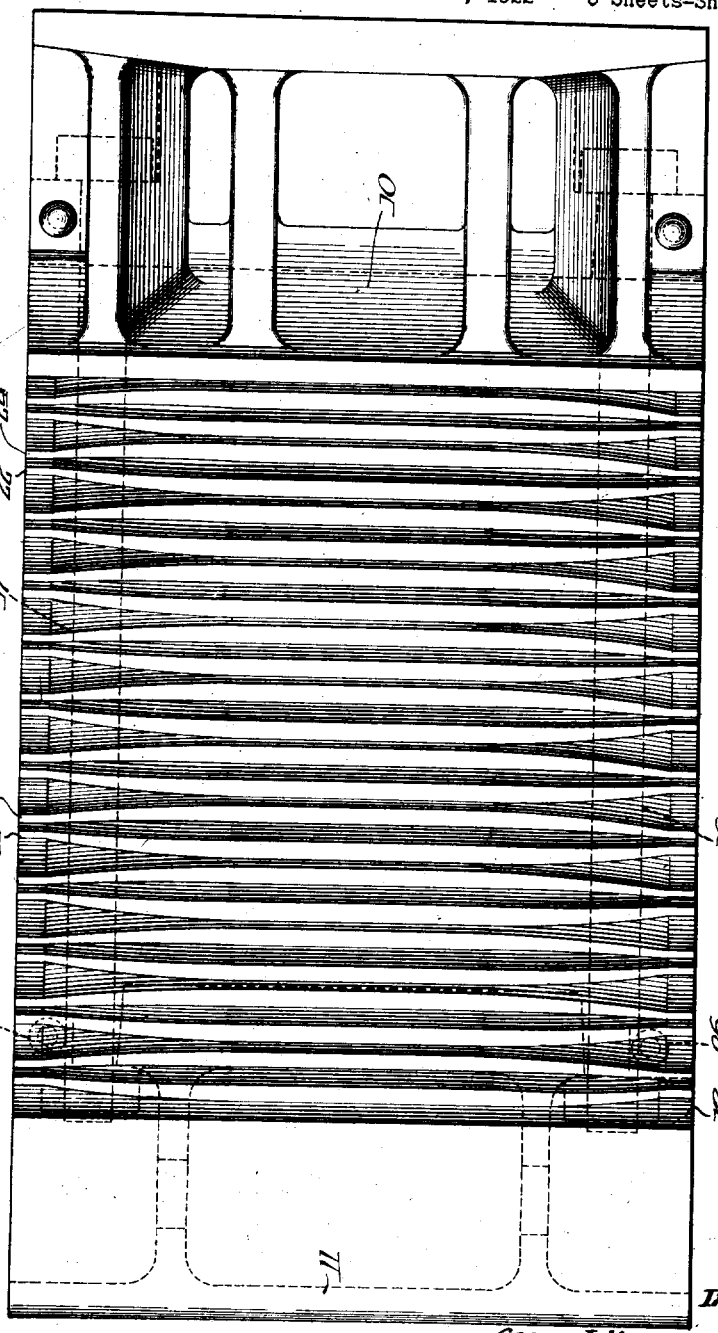
Fig. 2 is a plan view thereof.

The opposite action takes place in preparing the cooperating plates shown in Figs. 9 to 11 inclusive, the wings 24—24, 25—25, being bent inwardly, or, as viewed in Fig. 9, bent downwardly. The plates are composed of spring metal and after being prepared as described are assembled, as shown in Figs. 1 and 2, the respective plates being so associated that they cooperate in pairs, the deflected marginal portions of the wings of the respective plates of a pair being in contact. After being assembled as shown and placed under slight initial compression they are held in place by means of the bolts 16, 17, which enter the notches 18, 18, in the plates. The bolts are held in place against lateral displacement by means of the rivets 26.

In operation, assuming that the block 11 is advanced as under pull, the first action will be to effect the bending of the wings of the nested plates. This implies that each of the plates of a pair shall move closer together but in order that they may move into closer relation, the rear plate must slide on the forward plate. The extent of deflection of the ends of the wings of the plates determines the area which is in sliding contact and the frictional resistance is progressively increased as the load increases. This continues up to the capacity of the assembled plates at which time the plates will be in full contact and the rigging will be a solid body of metal. Thus it will be seen that there is no bursting tendency, neither is there any possibility of the parts adhering or failing to return to initial position; neither is there any excessive rebound as the total return force is only that exerted by the individual springs.

The fundamental advantage of a gear of this type over those specifically referred to is in that the degree of friction and consequently the capacity of the gear is wholly within the control of the designer. The capacity may be increased by increasing the number of plates; the sensitiveness of the gear is determined by the angle at which the V-shaped plates are bent. If a high capacity gear is desired, the angle of bend of the plates is made more obtuse whereas if the opposite action is desired, the plates are bent to bring their sides closer together. Obviously, therefore, the device is capable of wide variation not only in the angle of bend of the respective plates but also in the particular manner in which the plates are bent. In the design illustrated, the standard draw-bar movement of two and three quarters inches is provided for and a capacity is indicated which is far in excess of the capacity of any of the riggings on the market.

Obviously the exact form and arrangement of the parts is not essential and the invention is not limited except as indicated in the appended claims.

The claim is:

1. In a draft rigging, the combination of front and rear blocks and a series of plates held therebetween, said plates being of angular form and the edges thereof being laterally bent, the edges of successive plates being bent in opposite directions.

2. In a draft rigging, the combination of front and rear followers each having a pair of angularly disposed surfaces, a plurality of pairs of plates held between the followers and shaped to correspond substantially to said surfaces, the marginal portions of the pairs of plates being laterally deflected, the edges only of co-operating pairs of said plates being normally in contact.

3. In a shock absorber, the combination of follower blocks and a plurality of plates held therebetween, said plates being bent at an obtuse angle thereby forming wings the wings of each plate being curved, successive plates being oppositely curved.

4. In a shock absorber, the combination of follower blocks and a plurality of plates held therebetween, said plates being bent at an obtuse angle thereby forming wings which are symmetrically disposed about a transverse axis of the plate, the plates co-operating in pairs the wings of each plate being curved toward the wings of the co-operating plate.

5. In a shock absorber, the combination of follower blocks one having an angular projection and the other an angular recess, a plurality of plates having notches extending inwardly from opposite margins, said plates being bent into angular form along the line of said notches to correspond substantially to the shape of the projection of one of said follower blocks thereby forming wings, said wings being laterally bent from their middles toward their free ends, the wings of successive plates being oppositely bent toward each other.

6. In a shock absorber, the combination of front and rear follower blocks one having an angular projection and the other an angular recess, a plurality of spring metal plates held between the blocks, said plates having oppositely disposed notches extending inwardly from margins thereof, said plates being bent into V-shape on a line bisecting the respective notches, the plates being thinned toward the notched side edges and said thinned edges being bent out of the plane of the middle portion of the respective sides of the plates, successive plates being bent in opposite directions and being assembled in pairs whereby the thinned marginal edges only of the plates of a pair are in contact at initial load.

7. In a shock absorber, the combination of follower blocks and a plurality of plates held therebetween, said plates being bent at an angle thereby forming wings, the wings of certain plates being laterally deflected.

8. Friction plates for use in draft rigging, consisting of cooperating pairs, each plate being bent into generally V-shape, the material composing the sides of each plate of a pair being laterally bent, the edges only of the cooperating plates of a pair being normally in contact.

9. In friction shock absorbers, the combination of a pair of followers having a V-shaped projection and recess respectively, and V-shaped friction plates arranged in pairs, each side portion of each plate being arched whereby when assembled the marginal edges only of the plates of a pair are normally in contact and the middle portions of the plates of said pairs are in contact with the middle portions of plates of an adjacent pair, the area of contact and frictional resistance to relative sliding movement between all said plates increasing progressively as the arch in the plates is reduced under pressure.

10. In a shock absorber, a collapsible series of non-parallel resilient plates having normal contacts with each other in spaced parallel planes, which planes are oblique to the direction of compressive force, and means operating under the collapsing of the series for holding portions of said plates from relative lateral movement, whereby other portions are compelled to slide upon each other in the direction of inclination of said plates.

11. In a shock absorber, a collapsible series of pairs of reversely bowed resilient plates tangent to spaced parallel planes, which are oblique to the direction of compressive force, means operating during the collapsing of the series for holding the central contacting portions of said plates from relative lateral movement, whereby the end portions are compelled to frictionally slide upon each other in the direction of inclination of said plates.

12. In a shock absorber, a collapsible series of pairs of reversely bowed plates having their end and central portions tangent to spaced parallel planes oblique to the direction of compressive force, and means operating during the collapsing of the series for holding the central contacting portions of said plates from movement transverse to the direction of compressive force, whereby the contacting end portions of said plate slide relatively in the direction of inclination as said plates approach parallelism.

Signed at Avalon, California, this 5th day of July, 1924.

HELEN A. HARVEY,
*Executrix of George L. Harvey, Deceased.*

Signed at Chicago, Ill., this 9th day of July, 1924.

KELLOGG FAIRBANK,
*Executor of George L. Harvey, Deceased.*